(12) United States Patent
Takeshita et al.

(10) Patent No.: US 10,358,572 B2
(45) Date of Patent: Jul. 23, 2019

(54) CURABLE COMPOSITION, CURED PRODUCT THEREOF, AND OPTICAL MEMBER

(71) Applicant: DIC Corporation, Tokyo (JP)

(72) Inventors: Naohiro Takeshita, Ichihara (JP); Nobuo Kobayashi, Ichihara (JP); Yasuko Odani, Ichihara (JP); Ena Takeshita, Ichihara (JP)

(73) Assignee: DIC Corporation, Tokyo (JP)

( * ) Notice: Subject to any disclaimer, the term of this patent is extended or adjusted under 35 U.S.C. 154(b) by 35 days.

(21) Appl. No.: 15/541,185

(22) PCT Filed: Feb. 9, 2016

(86) PCT No.: PCT/JP2016/053770
§ 371 (c)(1),
(2) Date: Jun. 30, 2017

(87) PCT Pub. No.: WO2016/136454
PCT Pub. Date: Sep. 1, 2016

(65) Prior Publication Data
US 2017/0349780 A1    Dec. 7, 2017

(30) Foreign Application Priority Data

Feb. 25, 2015 (JP) .................... 2015-035263

(51) Int. Cl.
| | | |
|---|---|---|
| *C09D 163/00* | (2006.01) | |
| *C08F 2/44* | (2006.01) | |
| *C08F 290/06* | (2006.01) | |
| *C08F 292/00* | (2006.01) | |
| *C08K 3/22* | (2006.01) | |
| *C08F 299/00* | (2006.01) | |
| *C08L 71/02* | (2006.01) | |
| *G02B 1/10* | (2015.01) | |
| *B32B 37/12* | (2006.01) | |
| *C08F 222/10* | (2006.01) | |

(52) U.S. Cl.
CPC ............. *C09D 163/00* (2013.01); *C08F 2/44* (2013.01); *C08F 290/06* (2013.01); *C08F 292/00* (2013.01); *C08F 299/00* (2013.01); *C08K 3/22* (2013.01); *C08L 71/02* (2013.01); *G02B 1/10* (2013.01); *B32B 2037/1253* (2013.01); *C08F 2222/102* (2013.01); *C08F 2222/108* (2013.01); *C08K 2003/2244* (2013.01); *C08K 2201/011* (2013.01)

(58) Field of Classification Search
CPC ........ C09D 163/00; C08F 2/44; C08F 290/06; C08F 292/00; C08F 299/00; C08F 2222/102; C08F 2222/108; C08K 3/22; C08K 2003/2244; C08K 2201/011; C08L 71/02; G02B 1/10; B32B 2037/1253
USPC ........................................ 523/400
See application file for complete search history.

(56) References Cited

U.S. PATENT DOCUMENTS

2005/0192373 A1* 9/2005 Awaji ................. G02B 1/04
522/178
2012/0243099 A1* 9/2012 Kaneko ............... G02B 5/003
359/611
2015/0093690 A1   4/2015 Shimura et al.

FOREIGN PATENT DOCUMENTS

JP    2010-189506 A    9/2010
JP    2015-067794 A    4/2015

OTHER PUBLICATIONS

International Search Report dated Mar. 22, 2016, issued for PCT/JP2016/053770.

* cited by examiner

*Primary Examiner* — David T Karst
(74) *Attorney, Agent, or Firm* — Locke Lord LLP; James E. Armstrong, IV; Nicholas J. DiCeglie, Jr.

(57) ABSTRACT

There is provided a curable composition, which forms a cured product with high light transmittance, a high refractive index, and high scratch resistance, a cured product thereof, and an optical member. A curable composition contains zirconium oxide nanoparticles, a dispersant, and a (meth) acrylate compound. The dispersant has an acid value in the range of 100 to 300 mgKOH/g. The (meth)acrylate compound contains a (meth)acrylate compound having a poly (alkylene oxide) structure.

8 Claims, No Drawings

CURABLE COMPOSITION, CURED PRODUCT THEREOF, AND OPTICAL MEMBER

TECHNICAL FIELD

The present invention relates to a curable composition, which forms a cured product with high light transmittance, a high refractive index, and high scratch resistance, a cured product thereof, and an optical member.

BACKGROUND ART

Backlights of liquid crystal displays are equipped with a brightness enhancement sheet, such as a prism sheet or a microlens sheet, for improving brightness. The brightness-improving effect of brightness enhancement sheets increases with the refractive index. Thus, resin materials having a molecular structure with a higher refractive index are being developed, and the addition of inorganic fine particles to increase the refractive index is being investigated.

For example, Patent Literature 1 describes a curable composition containing zirconium oxide fine particles and phenoxyethyl acrylate. Cured products of such resin compositions containing inorganic fine particles have high refractive indexes but are easily scratched due to low elasticity.

CITATION LIST

Patent Literature

PTL 1: Japanese Unexamined Patent Application Publication No. 2010-189506

SUMMARY OF INVENTION

Technical Problem

Thus, it is an object of the present invention to provide a curable composition, which forms a cured product with high light transmittance, a high refractive index, and high scratch resistance, a cured product thereof, and an optical member.

Solution to Problem

As a result of extensive studies to solve the problems, the present inventors have found that the problems can be solved by using a curable composition containing inorganic fine particles, a dispersant, and a curable resin component, the dispersant having an acid value in the range of 100 to 300 mgKOH/g, the curable resin component being a (meth) acrylate compound having a poly(alkylene oxide) structure.

Thus, the present invention relates to a curable composition containing zirconium oxide nanoparticles (A), a dispersant (B), and a (meth)acrylate compound (C), wherein the dispersant (B) has an acid value in the range of 100 to 300 mgKOH/g, and the (meth)acrylate compound (C) contains a (meth)acrylate compound (C1) having a poly(alkylene oxide) structure.

The present invention also relates to a cured product and an optical member each produced by curing the curable composition.

Advantageous Effects of Invention

The present invention can provide a curable composition, which forms a cured product with high light transmittance, a high refractive index, and high scratch resistance, a cured product thereof, and an optical member.

DESCRIPTION OF EMBODIMENTS

The present invention will be described in detail below.

A curable composition according to the present invention contains zirconium oxide nanoparticles (A), a dispersant (B), and a (meth)acrylate compound (C). The dispersant (B) has an acid value in the range of 100 to 300 mgKOH/g. The (meth)acrylate compound (C) contains a (meth)acrylate compound (C1) having a poly(alkylene oxide) structure.

In curable compositions containing inorganic fine particles and a compound having a polar structure, such as the (meth)acrylate compound (C1) having a poly(alkylene oxide) structure, the inorganic fine particles tend to aggregate. Thus, such curable compositions have low storage stability, and cured films of such curable compositions have low transparency. In the present invention, however, the use of the dispersant (B) having an acid value in the range of 100 to 300 mgKOH/g provides a curable composition with high temporal stability. Furthermore, a cured product of the curable composition has not only a high refractive index but also high light transparency and scratch resistance.

The zirconium oxide nanoparticles (A) in a curable composition according to the present invention are produced by dispersing a raw material, zirconium oxide nanoparticles (a), in a dispersion medium containing the (meth)acrylate compound (C). In order to produce a cured product with a high refractive index and high light transparency, the zirconium oxide nanoparticles (A) in the curable composition preferably have an average particle size in the range of 20 to 100 nm.

In the present invention, the average particle size of the zirconium oxide nanoparticles (A) is measured with a particle size analyzer ("ELSZ-2" manufactured by Otsuka Electronics Co., Ltd.).

The zirconium oxide nanoparticles (a) used as a raw material may be known zirconium oxide nanoparticles and may have any shape, including spherical, hollow, porous, rod-like, plate-like, fibrous, or amorphous. In particular, spherical zirconium oxide nanoparticles are preferred due to their high dispersion stability and the high light transmittance and refractive index of cured products produced therewith. In order to achieve high dispersion stability and to produce a cured product with high light transmittance and a high refractive index, the zirconium oxide nanoparticles (a) preferably have an average primary particle size in the range of 1 to 50 nm, particularly preferably 1 to 30 nm. Although the zirconium oxide nanoparticles (a) may have any crystal structure, a monoclinic system is preferred in order to achieve high dispersion stability and to produce a cured product with high light transmittance and a high refractive index. In the present invention, a silane coupling agent (D) may be used to introduce a functional group on the surface of the zirconium oxide nanoparticles (a).

Examples of the silane coupling agent (D) include (meth)acryloyloxy silane coupling agents, such as 3-(meth)acryloyloxypropyltrimethylsilane, 3-(meth)acryloyloxypropylmethyldimethoxysilane, 3-(meth)acryloyloxypropyltrimethoxysilane, 3-(meth)acryloyloxypropylmethyldiethoxysilane, and 3-(meth)acryloyloxypropyltriethoxysilane; acryloxy silane coupling agents, such as 3-acryloxypropyltrimethoxysilane;

vinyl silane coupling agents, such as allyltrichlorosilane, allyltriethoxysilane, allyltrimethoxysilane, diethoxymethylvinylsilane, trichlorovinylsilane, vinyltrichlorosilane, vinyltrimethoxysilane, vinyltriethoxysilane, and vinyl tris(2-methoxyethoxy)silane;

epoxy silane coupling agents, such as diethoxy(glycidyloxypropyl)methylsilane, 2-(3,4-epoxycyclohexyl) ethyltrimethoxysilane, 3-glycidoxypropyltrimethoxysilane, 3-glycidoxypropylmethyldiethoxysilane, and 3-glycidoxypropyltriethoxysilane; styrene silane coupling agents, such as p-styryltrimethoxysilane;

amino silane coupling agents, such as N-2(aminoethyl)3-aminopropylmethyldimethoxysilane, N-2(aminoethyl)3-aminopropyltrimethoxysilane, N-2(aminoethyl)3-aminopropyltriethoxysilane, 3-aminopropyltrimethoxysilane, 3-aminopropyltriethoxysilane, 3-triethoxysilyl-N-(1,3-dimethyl-butylidene)propylamine, and N-phenyl-3-aminopropyltrimethoxysilane;

ureide silane coupling agents, such as 3-ureidopropyltriethoxysilane; chloropropyl silane coupling agents, such as 3-chloropropyltrimethoxysilane; mercapto silane coupling agents, such as 3-mercaptopropylmethyldimethoxysilane, and 3-mercaptopropyltrimethoxysilane; sulfide silane coupling agents, such as bis(triethoxysilylpropyl)tetrasulfide; and isocyanate silane coupling agents, such as 3-isocyanatepropyltriethoxysilane. Examples of an aluminum coupling agent include acetoalkoxyaluminum diisopropylate.

These silane coupling agents (D) may be used alone or in combination. Among these, silane coupling agents having a (meth)acryloyloxy group, a glycidyl group, or an epoxycyclohexyl group are preferred, and 3-(meth)acryloyloxypropyltrimethoxysilane is most preferred.

If the dispersant (B) in a curable composition according to the present invention has an acid value in the range of 100 to 300 mgKOH/g or more, inorganic fine particles rarely aggregate in the system even when a compound having a polar structure, such as the (meth)acrylate compound (C1) having a poly(alkylene oxide) structure, is used as a dispersion medium for the inorganic fine particles, as described above, and the resulting curable compositions have high stability. Furthermore, cured products of the curable compositions have not only a high refractive index but also high light transparency and scratch resistance. In particular, the acid value more preferably ranges from 120 to 200 mgKOH/g.

Examples of the dispersant (B) include polymers having an acid group, such as a carboxy group, a sulfone group, or a phosphate group. In particular, phosphate dispersants are preferred because they can provide stable curable compositions and cured products with high light transmittance and a high refractive index. More preferably, the dispersant (B) has a structure derived from a lactone compound. In order to produce a stable curable composition and a cured product with high light transmittance and a high refractive index, the dispersant (B) preferably has a weight-average molecular weight (Mw) in the range of 1,000 to 3,000, more preferably 1,300 to 2,000.

In the present invention, the weight-average molecular weight (Mw) is measured with a gel permeation chromatograph (GPC) under the following conditions.

Measuring apparatus: HLC-8220 manufactured by Tosoh Corporation

Column: guard column HXL-H manufactured by Tosoh Corporation
+TSKgel G5000HXL manufactured by Tosoh Corporation
+TSKgel G4000HXL manufactured by Tosoh Corporation
+TSKgel G3000HXL manufactured by Tosoh Corporation
+TSKgel G2000HXL manufactured by Tosoh Corporation Detector: differential refractometer (RI)

Data processing: SC-8010 available from Tosoh Corporation

Measurement conditions:
Column temperature: 40° C.
Solvent: tetrahydrofuran
Flow rate: 1.0 ml/min
Standard: polystyrene Sample: A tetrahydrofuran solution with a resin solid content of 0.4% by weight passed through a microfilter (100 μl).

In the preparation of a curable composition according to the present invention, the dispersant (B) may be used in any quantity. However, the amount of the dispersant (B) preferably ranges from 0.1% to 30% by mass, more preferably 0.5% to 15% by mass, of the total mass of the zirconium oxide nanoparticles (a).

The amount of the zirconium oxide nanoparticles (A) in a curable composition according to the present invention preferably ranges from 20% to 80% by mass, more preferably 30% to 60% by mass, in terms of handleability, a short dispersion time, and high stability of a dispersion liquid in the preparation of the curable composition described later.

The (meth)acrylate compound (C) in a curable composition according to the present invention contains a (meth)acrylate compound (C1) having a poly(alkylene oxide) structure as an essential component. Thus, a cured product of the curable composition has not only high light transmittance and a high refractive index but also high scratch resistance.

The poly(alkylene oxide) structure of the (meth)acrylate compound (C1) having the poly(alkylene oxide) structure may be a structure composed of a plurality of alkylene oxide structural units, such as an ethylene oxide structure, a propylene oxide structure, and/or a butylene oxide structure, and may be a structure composed of one type of alkylene oxide structural units or multiple types of alkylene oxide structural units randomly arranged. In particular, the number of the alkylene oxide structural units per molecule preferably ranges from 6 to 40, more preferably 16 to 36, in terms of a good balance between the light transmittance, refractive index, and scratch resistance of a cured product.

The (meth)acrylate compound (C1) having a poly(alkylene oxide) structure preferably includes 2 to 6 (meth)acryloyl groups per molecule in terms of high curability and high scratch resistance of a cured product.

The (meth)acrylate compound (C1) having a poly(alkylene oxide) structure may be produced by reacting a product of a ring-opening polymerization of a compound having a hydroxy group and a cyclic ether compound with an acrylic acid or a methacrylic acid.

Examples of the compound having a hydroxy group include aliphatic polyols, such as ethylene glycol, diethylene glycol, propylene glycol, 1,3-propanediol, 1,4-butanediol, 1,3-butanediol, 3-methyl-1,3-butanediol, 1,5-pentanediol, neopentyl glycol, 1,6-hexanediol, trimethylolethane, trimethylolpropane, and glycerin; and aromatic polyols, such as hydroquinone, 2-methylhydroquinone, 1,4-benzenedimethanol, 3,3'-biphenyldiol, 4,4'-biphenyldiol, biphenyl-3,3'-dimethanol, biphenyl-4,4'-dimethanol, bisphenol A, bisphenol B, bisphenol F, bisphenol S, 1,4-naphthalenediol, 1,5-naphthalenediol, 2,6-naphthalenediol, naphthalene-2,6-dimethanol, and 4,4',4"-methylidynetrisphenol.

Examples of the cyclic ether compound include ethylene oxide, propylene oxide, tetrahydrofuran, ethyl glycidyl ether, propyl glycidyl ether, butyl glycidyl ether, phenyl glycidyl ether, and allyl glycidyl ether.

A compound having a fluorene skeleton, such as represented by one of the following structural formulae (1) to (4), may be suitably used as the (meth)acrylate compound (C1) having a poly(alkylene oxide) structure.

[Chem. 1]

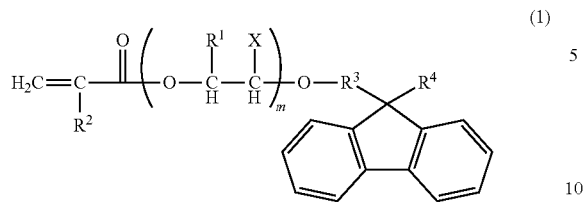
(1)

[In the general formula (1), X denotes a hydrogen atom or a hydroxy group, $R^1$ and $R^4$ independently denote a hydrogen atom or an alkyl group having 1 to 3 carbon atoms, $R^2$ denotes a hydrogen atom or a methyl group, $R^3$ denotes a direct bond or a methylene group, and m denotes an integer of 2 or more.]

[Chem. 2]

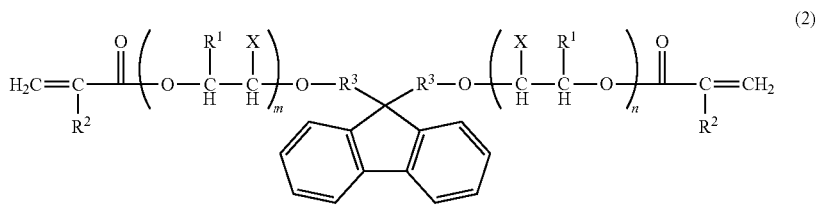
(2)

[In the general formula (2), X independently denotes a hydrogen atom or a hydroxy group, $R^1$ independently denotes a hydrogen atom or an alkyl group having 1 to 3 carbon atoms, $R^2$ independently denotes a hydrogen atom or a methyl group, $R^3$ independently denotes a direct bond or a methylene group, m and n independently denote an integer of 0 or 1 or more, and at least one of m and n is an integer of 2 or more.]

[Chem. 3]

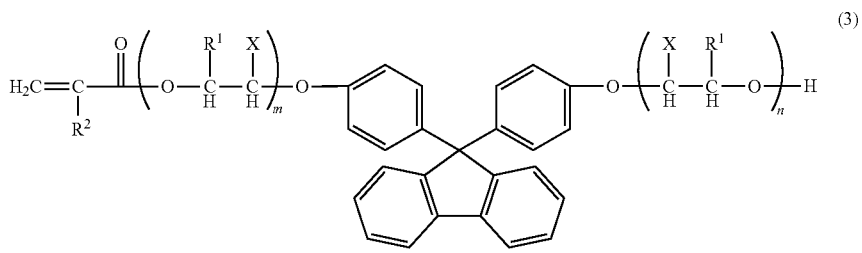
(3)

[In the general formula (3), two X's independently denote a hydrogen atom or a hydroxy group, two $R^1$'s independently denote a hydrogen atom or an alkyl group having 1 to 3 carbon atoms, $R^2$ denotes a hydrogen atom or a methyl group, m and n independently denote an integer of 0 or 1 or more, and at least one of m and n is an integer of 2 or more.]

[Chem. 4]

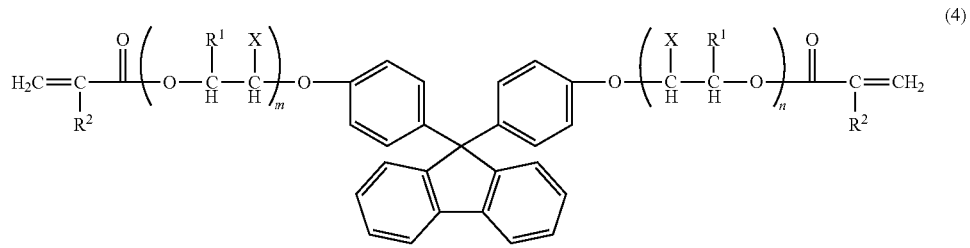

(4)

[In the general formula (4), two X's independently denote a hydrogen atom or a hydroxy group, two $R^1$'s independently denote a hydrogen atom or an alkyl group having 1 to 3 carbon atoms, two $R^2$'s independently denote a hydrogen atom or a methyl group, m and n independently denote an integer of 0 or 1 or more, and at least one of m and n is an integer of 2 or more.]

In the present invention, one type of the (meth)acrylate compound (C1) having a poly(alkylene oxide) structure may be used alone, or multiple types of the (meth)acrylate compound (C1) having a poly(alkylene oxide) structure may be used in combination.

A curable composition according to the present invention may contain another (meth)acrylate compound (C2) other than the (meth)acrylate compound (C1) having a poly(alkylene oxide) structure as the (meth)acrylate compound (C). In the presence of the (meth)acrylate compound (C2), the proportion of the (meth)acrylate compound (C1) having a poly(alkylene oxide) structure in the (meth)acrylate compound (C) is not particularly limited but preferably ranges from 5% to 80% by mass, more preferably 15% to 65% by mass, in terms of sufficient scratch resistance of a cured product according to the present invention.

Examples of the (meth)acrylate compound (C2) include mono(meth)acrylate compounds, such as n-butyl (meth)acrylate, isobutyl (meth)acrylate, tert-butyl (meth)acrylate, n-pentyl (meth)acrylate, n-hexyl (meth)acrylate, n-octyl (meth)acrylate, isooctyl (meth)acrylate, 2-ethylhexyl (meth)acrylate, glycidyl (meth)acrylate, morpholine (meth)acrylate, 2-hydroxyethyl (meth)acrylate, 2-hydroxypropyl (meth)acrylate, 4-hydroxybutyl (meth)acrylate, 2-methoxyethyl (meth)acrylate, 2-butoxyethyl (meth)acrylate, 2-ethoxyethyl (meth)acrylate, 2-(2-ethoxyethoxy)ethyl (meth)acrylate, 4-nonylphenoxyethylene glycol (meth)acrylate, tetrahydrofurfuryl (meth)acrylate, caprolactone-modified tetrahydrofurfuryl (meth)acrylate, cyclohexyl (meth)acrylate, cyclohexylmethyl (meth)acrylate, cyclohexylethyl (meth)acrylate, isobornyl (meth)acrylate, dicyclopentanyl (meth)acrylate, dicyclopentanyloxyethyl (meth)acrylate, dicyclopentenyl (meth)acrylate, dicyclopentenyloxyethyl (meth)acrylate, phenyl (meth)acrylate, benzyl (meth)acrylate, phenoxyethyl (meth)acrylate, phenoxy 2-methylethyl (meth)acrylate, phenoxyethoxyethyl (meth)acrylate, paracumylphenoxyethyl (meth)acrylate, phenoxybenzyl (meth)acrylate, 2-hydroxy-3-phenoxypropyl (meth)acrylate, phenylbenzyl (meth)acrylate, phenylphenoxyethyl acrylate, 2-acryloyloxyethyl hexahydrophthalate, and mono(meth)acrylate compounds having a fluorene skeleton represented by the following general formula (5) or (6);

[Chem. 5]

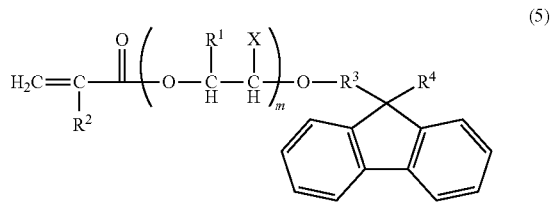

(5)

[In the general formula (5), X denotes a hydrogen atom or a hydroxy group, $R^1$ and $R^4$ independently denote a hydrogen atom or an alkyl group having 1 to 3 carbon atoms, $R^2$ denotes a hydrogen atom or a methyl group, $R^3$ denotes a direct bond or a methylene group, and m denotes 0 or 1.]

[Chem. 6]

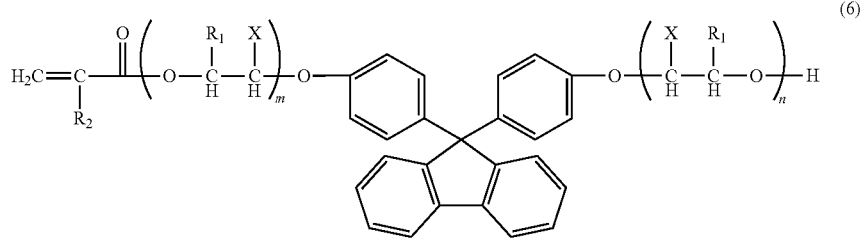

(6)

[In the general formula (6), two X's independently denote a hydrogen atom or a hydroxy group, two R1's independently denote a hydrogen atom or an alkyl group having 1 to 3 carbon atoms, R2 denotes a hydrogen atom or a methyl group, and m and n independently denote 0 or 1.]

di(meth)acrylate compounds, such as ethylene glycol di(meth)acrylate, propylene glycol di(meth)acrylate, butylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, bisphenol A di(meth)acrylate, bisphenol F di(meth)acrylate, dicyclopentanyl di(meth)acrylate, glycerol di(meth)acrylate, neopentylglycol hydroxypivalate di(meth)acrylate, caprolactone-modified hydroxypivalic acid neopentyl glycol di(meth)acrylate, tetrabromobisphenol A di(meth)acrylate, hydropivalaldehyde-modified trimethylolpropane di(meth)acrylate, 1,4-cyclohexanedimethanol di(meth)acrylate, bis[(meth)acryloylmethyl]biphenyl, and di(meth)acrylate compounds having a fluorene skeleton represented by the following general formula (7) or (8);

[Chem. 7]

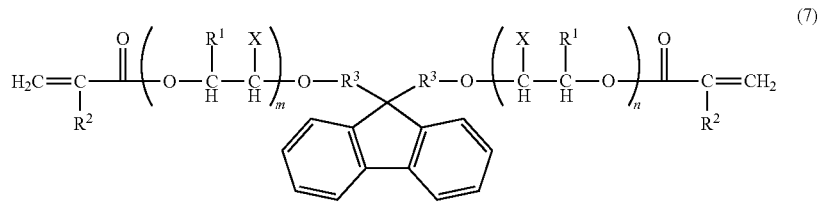

(7)

[In the general formula (7), X independently denotes a hydrogen atom or a hydroxy group, $R^1$ independently denotes a hydrogen atom or an alkyl group having 1 to 3 carbon atoms, $R^2$ independently denotes a hydrogen atom or a methyl group, $R^3$ independently denotes a direct bond or a methylene group, and m and n independently denote 0 or 1.]

[Chem. 8]

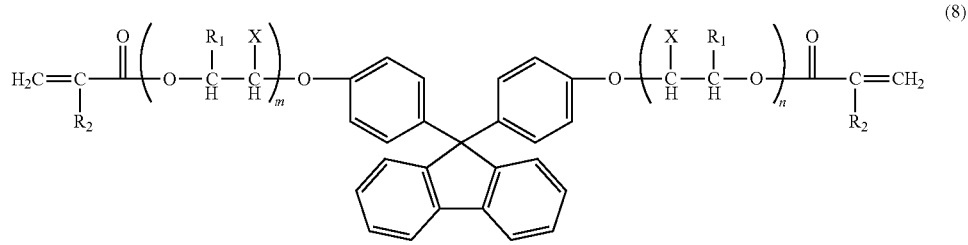

(8)

[In the general formula (8), two X's independently denote a hydrogen atom or a hydroxy group, two R1's independently denote a hydrogen atom or an alkyl group having 1 to 3 carbon atoms, two R2's independently denote a hydrogen atom or a methyl group, and m and n independently denote 0 or 1.]

tri- or higher-functional (meth)acrylate compounds, such as trimethylolpropane tri(meth)acrylate, pentaerythritol tri(meth)acrylate, glycerol tri(meth)acrylate, ditrimethylolpropane tetra(meth)acrylate, dipentaerythritol penta(meth)acrylate, and dipentaerythritol hexa(meth)acrylate;

epoxy (meth)acrylates produced by reacting a polyol, such as hydroquinone, 2-methylhydroquinone, 1,4-benzenedimethanol, 3,3'-biphenyldiol, 4,4'-biphenyldiol, biphenyl-3,3'-dimethanol, biphenyl-4,4'-dimethanol, bisphenol A, bisphenol B, bisphenol F, bisphenol S, 1,4-naphthalenediol, 1,5-naphthalenediol, 1,6-naphthalenediol, 2,6-naphthalenediol, 2,7-naphthalenediol, naphthalene-2,6-dimethanol, or 4,4',4''-methylidynetrisphenol, with epihalohydrin to yield an epoxy resin and by reacting the epoxy resin with (meth)acrylic acid; and urethane (meth)acrylates produced by reacting a diisocyanate compound, such as butane-1,4-diisocyanate, hexamethylene diisocyanate, 2,2,4-trimethylhexamethylene diisocyanate, 2,4,4-trimethylhexamethylene diisocyanate, xylylene diisocyanate, m-tetramethylxylylene diisocyanate, cyclohexane-1,4-diisocyanate, isophorone diisocyanate, lysine diisocyanate, dicyclohexylmethane-4,4'-diisocyanate, 1,3-bis(isocyanatomethyl)cyclohexane, methylcyclohexane diisocyanate, 1,5-naphthylene diisocyanate, 4,4'-diphenylmethane diisocyanate, 2,2'-bis(paraphenyl isocyanate)propane, 4,4'-dibenzyl diisocyanate, dialkyldiphenylmethane diisocyanate, tetraalkyldiphenylmethane diisocyanate, 1,3-phenylene diisocyanate, 1,4-phenylene diisocyanate, or tolylene diisocyanate, or a nurate-modified substance thereof with a (meth)acrylate compound having a hydroxy group, such as 2-hydroxyethyl acrylate, 2-hydroxypropyl acrylate, 4-hydroxybutyl acrylate, glycerin diacrylate, trimethylolpropane diacrylate, pentaerythritol triacrylate, or dipentaerythritol pentaacrylate.

These (meth)acrylate compounds (C2) may be used alone or in combination. Among these, monofunctional (meth)acrylate compounds having an aromatic ring, such as benzyl (meth)acrylate, phenoxyethyl (meth)acrylate, phenoxybenzyl (meth)acrylate, phenylbenzyl (meth)acrylate, and phenylphenoxyethyl (meth)acrylate, are preferred because they can provide curable compositions with a higher refractive index. Urethane (meth)acrylates and epoxy (meth)acrylates are also preferred due to high surface hardness of cured films, and epoxy (meth)acrylates are more preferred. The epoxy resin raw materials for the epoxy (meth)acrylates preferably have an epoxy equivalent in the range of 200 to 600 g/equivalent.

A monofunctional (meth)acrylate compound having an aromatic ring and a urethane (meth)acrylate or an epoxy (meth)acrylate are used in combination due to a good balance between the refractive index and the surface hardness of a cured film. In this case, the monofunctional (meth)acrylate compound having an aromatic ring preferably constitutes 20% to 90% by mass of the (meth)acrylate compound (C). The urethane (meth)acrylate or epoxy (meth)acrylate preferably constitutes 5% to 50% by mass of the (meth)acrylate compound (C).

In addition to the components (A) to (D), a curable composition according to the present invention may contain an additive agent component, such as a polymerization initiator, a photosensitizer, a curing accelerator, an organic solvent, a nonreactive resin, a filler, an inorganic filler, an organic filler, a coupling agent, a tackifier, an antifoaming agent, a leveling agent, an adhesion aid, a release agent, a lubricant, an ultraviolet absorber, an antioxidant, a heat stabilizer, a plasticizer, a flame retardant, a pigment, and/or a dye.

The polymerization initiator may be an intramolecular bond cleavage type photopolymerization initiator, for example, an acetophenone, such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenylketone, 2-methyl-2-morpholino(4-thiomethylphenyl)propan-1-one, or 2-benzyl-2-dimethylamino-1-(4-morpholinophenyl)-butanone; a benzoin, such as benzoin, benzoin methyl ether, or benzoin isopropyl ether; an acylphosphine oxide, such as 2,4,6-trimethylbenzoindiphenylphosphine oxide; or benzil or a methylphenylglyoxy ester.

The polymerization initiator may be an intramolecular hydrogen abstraction type photopolymerization initiator, for example, a benzophenone, such as benzophenone, methyl o-benzoylbenzoate-4-phenylbenzophenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl)benzophenone, or 3,3'-dimethyl-4-methoxybenzophenone; a thioxanthone, such as 2-isopropylthioxanthone, 2,4-dimethylthioxanthone, 2,4-diethylthioxanthone, or 2,4-dichlorothioxanthone; an aminobenzophenone, such as Michler's ketone or 4,4'-diethylaminobenzophenone; or 10-butyl-2-chloroacridone, 2-ethylanthraquinone, 9,10-phenanthrenequinone, or camphorquinone.

The photosensitizer may be an amine, such as triethanolamine, methyldiethanolamine, triisopropanolamine, methyl 4-dimethylaminobenzoate, ethyl 4-dimethylaminobenzoate, isoamyl 4-dimethylaminobenzoate, (2-dimethylamino)ethyl benzoate, (n-butoxy)ethyl 4-dimethylaminobenzoate, or 2-ethylhexyl 4-dimethylaminobenzoate.

The organic solvent may be ethanol, isopropanol, butanol, cyclohexanol, methyl ethyl ketone, methyl isobutyl ketone, cyclohexanone, ethyl acetate, propyl acetate, butyl acetate, methyl cellosolve, cellosolve, butyl cellosolve, cellosolve acetate, tetrahydrofuran, 1,4-dioxane, n-hexane, cyclopentane, toluene, xylene, N,N-dimethylformamide, N,N-dimethylacetamide, dichloromethane, trichloroethane, trichloroethylene, or hydrofluoroether.

A curable composition according to the present invention may be produced by any method and may be produced from a zirconium dispersion liquid, which is produced by dispersing raw materials containing the zirconium oxide nanoparticles (a), the dispersant (B), and the (meth)acrylate compound (C) as essential components using a media type wet dispersing apparatus.

In particular, in addition to the zirconium oxide nanoparticles (a), the dispersant (B), and the (meth)acrylate compound (C), an organic solvent (E) is preferably used to facilitate the preparation of a zirconium dispersion liquid.

More specifically, the zirconium oxide nanoparticles (a) are dispersed in a dispersion medium (X) composed of components other than the zirconium oxide nanoparticles (a) and the (meth)acrylate compound (C) to produce a zirconium dispersion liquid, and the (meth)acrylate compound (C) is added to the zirconium dispersion liquid (method 1). Alternatively, the zirconium oxide nanoparticles (a) are dispersed in a dispersion medium (X) composed of all the components other than the zirconium oxide nanoparticles (a) to directly produce a curable composition (method 2).

In both the method 1 and the method 2, the viscosity of the dispersion medium (X) is preferably adjusted to be 200 mPa·s or less at 25° C. so that the dispersion viscosity is optimized to separate the media from the raw material composition in a pulverizer. The viscosity in the present invention is measured by a known method, for example, with a Brookfield type viscometer.

The media type wet dispersing apparatus used in the production method may be any known apparatus, for example, a bead mill (such as Starmill LMZ-015 manufactured by Ashizawa Finetech Ltd. or Ultra Apex Mill UAM-015 manufactured by Kotobuki Industries Co., Ltd.).

The media used in the dispersing apparatus may be any known beads, preferably zirconia, alumina, silica, glass, silicon carbide, or silicon nitride. The media preferably have an average particle size in the range of 50 to 500 µm, more preferably 100 to 200 µm. A particle size of 50 µm or more results in appropriate impact force for the raw powder and no extra dispersion time. A media particle size of 500 µm or less results in appropriate impact force for the raw powder, little increase in the surface energy of dispersed particles, and prevention of reaggregation.

The dispersion time can be reduced by a two-step process using large media with large impact force in initial pulverization of the raw powder and then using small media for dispersed particles having a smaller particle size. The small media are unlikely to cause reaggregation.

It is desirable that the media be sufficiently polished to suppress the decrease in the light transmittance of the resulting dispersion liquid.

In the production method with the media type wet dispersing apparatus, the raw materials may be charged in the dispersing apparatus in any order. However, at least the dispersant (B) may be finally supplied to produce a curable composition with high dispersion stability using a small amount of dispersant (B). More specifically, after the raw materials other than the dispersant (B) are mixed or predispersed, the dispersant (B) is added to complete the dispersion process.

After dispersion, depending on the intended use, various additive agents may be added, or volatile components may be distilled off, to yield a curable composition according to the present invention.

A curable composition according to the present invention can be cured by heat or an active energy beam. The active energy beam may be any active energy beam that can cure a curable composition according to the present invention, particularly preferably ultraviolet light.

The ultraviolet light source may be a fluorescent chemical lamp, black light, a low-pressure, high-pressure, or ultra-high-pressure mercury lamp, a metal halide lamp, or sunlight. The irradiation intensity of ultraviolet light may be fixed or may be changed to fine-tune the physical properties of the cured product.

Instead of ultraviolet light, the active energy beam may be visible light or an electron beam. A curable composition according to the present invention has inherent spectral sensitivity at 200 to 400 nm. In the absence of a photopolymerization initiator, the energy of a commonly-used energy beam may be, but is not limited to, 20 mW/cm$^2$.

A cured product according to the present invention can preferably be used as an optical member, for example, an antireflection coat for plastic lenses, brightness enhancement films (prism sheets), film type liquid crystal devices, touch panels, and plastic optical components.

EXAMPLES

The present invention will be described in detail below with examples and comparative examples.

The components and dispersing apparatus used in the production examples and examples are described in detail below.

TABLE 1

| | |
|---|---|
| Zirconium oxide nanoparticles (a1) | "UEP-100 (surface-untreated type)" manufactured by Daiichi Kigenso Kagaku Kogyo Co., Ltd., primary particle size 11 nm |
| Zirconium oxide nanoparticles (a2) | "UEP-100 (surface-treated type)" manufactured by Daiichi Kigenso Kagaku Kogyo Co., Ltd., primary particle size 11 nm |
| Dispersant (B1) | "Disperbyk-111" manufactured by BYK-Chemie, phosphate dispersant, acid value 130 mgKOH/g, weight-average molecular weight (Mw) 1400 |
| Dispersant (B'1) | "Dispalon PW-36" manufactured by Kusumoto Chemicals, Ltd., phosphate dispersant, acid value 70 mgKOH/g, weight-average molecular weight (Mw) 397 |
| Dispersant (B'2) | "Solplus D-520" manufactured by Lubrizol Japan Limited, acid value 260 mgKOH/g, weight-average molecular weight (Mw) 980 |
| Dispersant (B'3) | "Tegodispers 655" manufactured by Evonik Industries AG., acid value 0 mgKOH/g, weight-average molecular weight (Mw) 290 |
| Silane coupling agent (D1) | "KBM-503" manufactured by Shin-Etsu Chemical Co., Ltd., 3-(meth)acryloyloxypropyltrimethoxysilane |
| (Meth)acrylate compound having poly(alkylene oxide) structure (C1-1) | Compound represented by the following structural formula (C1-1) |
| (Meth)acrylate compound having poly(alkylene oxide) structure (C1-2) | Compound represented by the following structural formula (C1-2) |
| Another (meth)acrylate compound (C2-1) | Phenoxyethyl acrylate |
| Another (meth)acrylate compound (C2-2) | Ortho-phenylphenoxyethyl acrylate |
| Another (meth)acrylate compound (C2-3) | Epoxy acrylate produced by a reaction between a bisphenol-A epoxy resin (epoxy equivalent 450 g/equivalent) and acrylic acid |
| Polymerization initiator | "Lucirin TPO" manufactured by BASF Japan Ltd., 2,4,6-trimethylbenzoyldiphenylphosphine oxide |
| Media type wet dispersing apparatus | "Starmill LMZ-015" manufactured by Ashizawa Finetech Ltd., 2,4,7-trimethylbenzoyldiphenylphosphine oxide |

[Chem. 9]

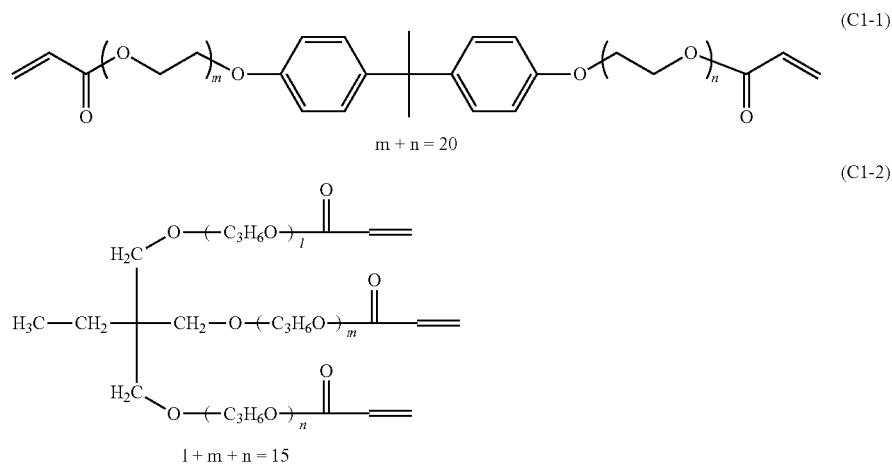

Production Example 1 Production of Zirconium Dispersion Liquid (1)

50 g of zirconium oxide nanoparticles (a1), 7.5 g of a silane coupling agent (D1), and 183.0 g of methyl ethyl ketone were mixed in a dispersion mixer for 30 minutes for rough dispersion. The liquid mixture was dispersed with zirconia beads having a particle size of 100 μm in a media type wet dispersing apparatus. The particle size was monitored during dispersion. After dispersion for 100 minutes, the addition of 5 g of a dispersant (B1) and dispersion for another 20 minutes yielded a zirconium dispersion liquid (1).

Production Example 2 Production of Zirconium Dispersion Liquid (2)

A zirconium dispersion liquid (2) was produced under the same conditions as in Production Example 1 except that the zirconium oxide nanoparticles (a1) in Production Example 1 were replaced with zirconium oxide nanoparticles (a2).

Production Example 3 Production of Zirconium Dispersion Liquid (3)

A zirconium dispersion liquid (3) was produced under the same conditions as in Production Example 1 except that 7.5 g of the silane coupling agent (D1) in Production Example 1 was increased to 15 g, and 5 g of the dispersant (B1) was increased to 10 g.

Production Example 4 Production of Zirconium Dispersion Liquid (4)

A zirconium dispersion liquid (4) was produced under the same conditions as in Production Example 1 except that the zirconium oxide nanoparticles (a1) in Production Example 3 were replaced with zirconium oxide nanoparticles (a2).

Production Example 5 Production of Zirconium Dispersion Liquid (5)

A zirconium dispersion liquid (5) was produced under the same conditions as in Production Example 1 except that the silane coupling agent (D1) was not used.

Comparative Production Example 1 Production of Zirconium Dispersion Liquid (1')

A zirconium dispersion liquid (1') was produced under the same conditions as in Production Example 1 except that the dispersant (B1) in Production Example 1 was replaced with a dispersant (B'1).

Comparative Production Example 2 Production of Zirconium Dispersion Liquid (2')

A zirconium dispersion liquid (2') was produced under the same conditions as in Production Example 1 except that the dispersant (B1) in Production Example 1 was replaced with a dispersant (B'2).

Comparative Production Example 3 Production of Zirconium Dispersion Liquid (3')

A zirconium dispersion liquid (3') was produced under the same conditions as in Production Example 1 except that the dispersant (B1) in Production Example 1 was replaced with a dispersant (B'3).

Example 1

Preparation of Curable Composition (1)

A (meth)acrylate compound was added to the zirconium dispersion liquid (1) produced in Production Example 1 at a proportion shown in Table 1, and volatile components were removed under vacuum with an evaporator. A polymerization initiator was added to prepare a curable composition (1).

Measurement of Particle Size of Zirconium Oxide Nanoparticles

The average particle size of the zirconium oxide nanoparticles in the curable composition (1) was measured with a particle size analyzer ("ELSZ-2" manufactured by Otsuka Electronics Co., Ltd.).

Production of Cured Product (1)

The curable composition (1) was applied to a glass substrate with an applicator and was photo-cured in air with a 120 W/cm high-pressure mercury lamp at 1000 mJ/cm$^2$, thereby producing a cured product (1) having a thickness of approximately 100 μm.

Evaluation 1 Measurement of Refractive Index of Cured Product

The refractive index of the cured product (1) was measured with an Abbe refractometer. Table 1 shows the results.

Evaluation 2 Measurement of Transparency of Cured Product

The transparency of the cured product (1) was measured with a haze meter. Table 1 shows the results.

Evaluation 3 Evaluation of Scratch Resistance of Cured Product

The cured product (1) was scratched with a pencil with hardness H at a load of 300 g according to JIS K 5400. The following ratings were based on the scratch recovery time. Table 1 shows the results.

5 Within 1 second
4 More than 1 second and no more than 10 seconds
3 More than 10 seconds and no more than 1 minute
2 More than 1 minute and no more than 5 minutes
1 More than 5 minutes
0 No recovery (scratches were observed the following day)

Examples 2 to 6 and Comparative Examples 1 to 3

Curable compositions and cured products were produced and tested in the same manner as in Example 1. Tables 1 and 2 show the results.

TABLE 2

| | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Zirconium dispersion liquid | (1) | (2) | (3) | (4) | (1) | (5) | (1) | (1) | (1) | (1) | (1) | (1) |
| (Meth)acrylate compound having poly(alkylene oxide) structure (C1-1) [g] | 10 | 10 | 10 | 10 | 30 | | 20 | 30 | 10 | 10 | 10 | 10 |
| (Meth)acrylate compound having poly(alkylene oxide) structure (C1-2) [g] | | | | | | 10 | | | | 5 | | 5 |
| Another (meth)acrylate compound (C2-1) [g] | 40 | 40 | 40 | 40 | 40 | 40 | 30 | 20 | | | | |
| Another (meth)acrylate compound (C2-2) [g] | | | | | | | | | 30 | 25 | 40 | 35 |
| Another (meth)acrylate compound (C2-3) [g] | | | | | | | | | 10 | 10 | | |
| Polymerization initiator [g] | 4 | 4 | 4 | 4 | 4 | 4 | 4 | 4 | 4 | 4 | 4 | 4 |
| Particle size of zirconium oxide nanoparticles [nm] | 40 | 42 | 37 | 36 | 45 | 39 | 40 | 43 | 41 | 40 | 43 | 40 |

TABLE 2-continued

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Refractive index measurement | 1.63 | 1.61 | 1.61 | 1.59 | 1.63 | 1.65 | 1.59 | 1.58 | 1.65 | 1.64 | 1.64 | 1.63 |
| Transparency measurement | 3.0 | 3.2 | 2.5 | 2.3 | 3.5 | 2.5 | 3.1 | 3.4 | 3.0 | 3.1 | 2.5 | 3.2 |
| Evaluation of Scratch Resistance | 4 | 4 | 4 | 4 | 5 | 3 | 5 | 5 | 5 | 5 | 4 | 4 |

TABLE 3

|  | Comparative Example 1 | Comparative Example 2 | Comparative Example 3 |
|---|---|---|---|
| Zirconium dispersion liquid | (1') | (2') | (3') |
| (Meth)acrylate compound having poly(alkylene oxide) structure (C1-1) [g] | 10 | 10 | 10 |
| (Meth)acrylate compound having poly(alkylene oxide) structure (C1-2) [g] |  |  |  |
| Another (meth)acrylate compound (C2-1) [g] | 40 | 40 | 40 |
| Another (meth)acrylate compound (C2-2) [g] |  |  |  |
| Another (meth)acrylate compound (C2-3) [g] |  |  |  |
| Polymerization initiator [g] | 4 | 4 | 4 |
| Particle size of zirconium oxide nanoparticles [nm] | 65 | 78 | 53 |
| Refractive index measurement | 1.63 | 1.61 | 1.61 |
| Transparency measurement | 6.0 | 7.2 | 5.3 |
| Evaluation of Scratch Resistance | 0 | 0 | 0 |

INDUSTRIAL APPLICABILITY

A curable composition according to the present invention can form a cured product with high light transparency, a high refractive index, and high scratch resistance. The cured product can be suitably used as an optical member.

The invention claimed is:

1. A curable composition comprising: zirconium oxide nanoparticles (A); a dispersant (B); and a (meth)acrylate compound (C), wherein the dispersant (B) has an acid value in the range of 100 to 300 mgKOH/g, and the (meth)acrylate compound (C) contains a (meth)acrylate compound (C1) having a poly(alkylene oxide) structure, wherein the (meth)acrylate compound (C1) having a poly(alkylene oxide) structure includes 15 to 40 alkylene oxide structural units per molecule.

2. The curable composition according to claim 1, wherein the dispersant (B) is a polymer having a weight-average molecular weight (Mw) in the range of 1,000 to 3,000.

3. The curable composition according to claim 1, wherein the (meth)acrylate compound (C1) having a poly(alkylene oxide) structure includes 2 to 6 (meth)acryloyl groups per molecule.

4. The curable composition according to claim 1, wherein the (meth)acrylate compound (C1) having a poly(alkylene oxide) structure constitutes 5% to 80% by mass of the (meth)acrylate compound (C).

5. A cured product of the curable composition according to claim 1.

6. An optical member produced by curing the curable composition according to claim 1.

7. The curable composition according to claim 1, wherein the (meth)acrylate compound (C1) having a poly(alkylene oxide) structure comprises a compound represented by the formula (C1-1) or (C1-2) or a mixture thereof:

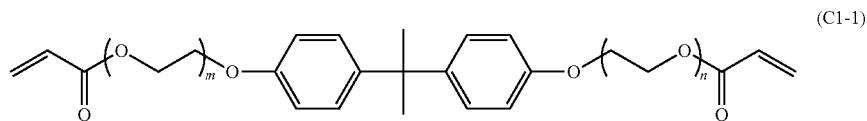

(C1-1)

wherein, in formula (C1-1), m+n=20;

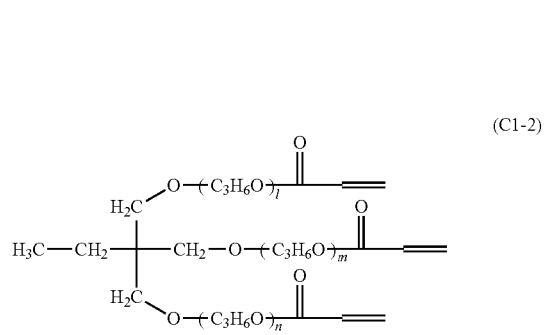

(C1-2)

wherein, in formula (C1-2), l+m+n=30.

8. The curable composition according to claim 1, wherein the (meth)acrylate compound (C1) having a poly(alkylene oxide) structure comprises a compound represented by the formula (C1-1) or (C1-2) or a mixture thereof:

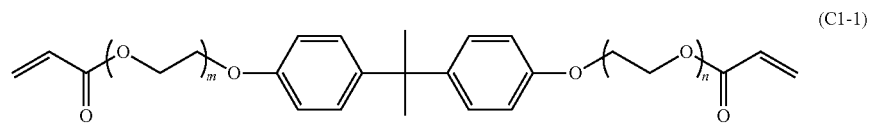
wherein, in formula (C1-1), m+n=20;
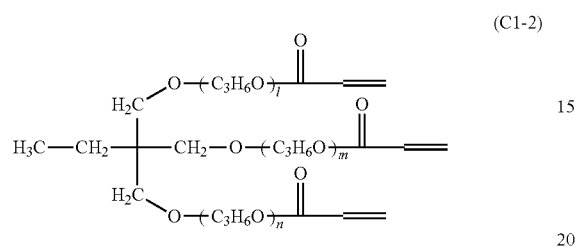
wherein, in formula (C1-2), l+m+n=15.
* * * * *